United States Patent [19]
Rizvi et al.

[11] Patent Number: 5,925,398
[45] Date of Patent: Jul. 20, 1999

[54] PROCESSED MOZZARELLA CHEESE

[75] Inventors: Syed S. H. Rizvi, Ithaca, N.Y.; Archna Shukla, Bloomington, Minn.; Jaruk Srikiatden, Bangkok, Thailand

[73] Assignee: Cornell Research Foundation, Inc., Ithaca, N.Y.

[21] Appl. No.: 08/840,314

[22] Filed: Apr. 11, 1997

Related U.S. Application Data

[60] Provisional application No. 60/015,467, Apr. 12, 1997.
[51] Int. Cl.⁶ ..................... A23C 19/06
[52] U.S. Cl. ............ 426/582; 426/36; 426/516; 426/518; 426/519; 426/520; 425/84; 425/308; 425/310; 425/412; 425/422; 425/437; 425/444; 99/452
[58] Field of Search ............... 426/582, 36, 516, 426/518, 519, 520; 425/84, 308, 310, 412, 422, 437, 444; 99/452

[56] References Cited

U.S. PATENT DOCUMENTS

| | | | |
|---|---|---|---|
| 1,522,383 | 1/1925 | Parsons et al. | 99/453 |
| 1,523,678 | 1/1925 | Wheeler et al. | 99/453 |
| 2,021,899 | 11/1935 | Schneider | 99/11 |
| 2,733,148 | 1/1956 | Russo | 99/116 |
| 3,692,540 | 9/1972 | Mauk | 99/116 |
| 4,066,800 | 1/1978 | Rosenau et al. | 426/582 |
| 4,669,254 | 6/1987 | Muzzarelli | 53/518 |
| 5,104,675 | 4/1992 | Callahan et al. | 426/582 |
| 5,200,216 | 4/1993 | Barz et al. | 426/36 |
| 5,234,700 | 8/1993 | Barz et al. | 426/42 |
| 5,567,464 | 10/1996 | Barz et al. | 426/582 |

OTHER PUBLICATIONS

Jackson, S. Scaleup from a ZSK to a Continua, Werner & Pfleiderer, Processing Lines—A Periodic Look at Food Extrusion Technology, vol. 6, No. 1, 2 pages.
Barbano et al., J. Dairy Sci, vol. 77, pp. 2687–2694, 1994.
Viotto et al., J Dairy Sci., vol. 78, suppl 1, p. 116, 1995.
Mulraney et al., J. Dairy Sci, vol. 78, suppl 1., p. 106, 1995.

*Primary Examiner*—Chhaya D. Sayala
*Attorney, Agent, or Firm*—Brown, Pinniski & Michaels, P.C.

[57] ABSTRACT

A method of making processed mozzarella cheese that does not require any aging or refrigeration during storage is disclosed herein. This is accomplished by dicing cheese curd, adding emulsifier, and thermomechanically treating in an extruder to stretch and cook the curd. Fresh processed mozzarella cheese having functionality similar to the aged mozzarella cheese is achieved by addition of emulsifier to soften casein and inputting sufficient mechanical energy to establish the appropriate fibrous structure. Longer shelf-life and storage without refrigeration is achieved by application of suitable time-temperature combination to inactivate proteolytic enzymes and microorganisms.

11 Claims, 4 Drawing Sheets

Fig. 1  Comparison of Mozzarella Cheese and Processed Mozzarella Cheese making techniques

PROCESSED MOZZARELLA CHEESE

RELATED APPLICATIONS

This is a continuing application claiming priority from provisional application Ser. No. 60/015467 filed Apr. 12, 1997, under 35 U.S.C. §119(e).

FIELD OF THE INVENTION

The invention pertains to the field of production of cheese. More particularly, the invention pertains to the production of a processed shelf-stable mozzarella cheese, which can be stored or transported at ambient or refrigerated temperature.

BACKGROUND OF THE INVENTION

Mozzarella cheese is one of the stretched curd cheeses which undergoes a characteristic hot water stretching step to provide both the characteristic oriented fibrous structure and the appropriate melting properties of the finished product. After aging, the normally produced finished product is usefully in cooking, general consumption, and in its most popular use—the production of pizza.

Thus, with an increasing popularity of pizza, the corresponding consumption of mozzarella cheese has also increased. The increase in production has been from 4,819 million pounds in 1983, to 6,634 million pounds in 1992 (United States Department of Agriculture, 1993). This trend towards increasing consumption is only expected to increase in the coming years. Thus, any improvements in the manufacture of pizza that would reduce costs or improve qualitative characteristics would have significant economic value.

Since mozzarella is mainly used for pizza making, its melt characteristics such as blistering, meltability, and stretchability are most important for its consumer acceptance. Mozzarella needs to be aged for 2–4 weeks for break down of proteins through proteolysis in order to develop these desirable melt characteristics. Unaged fresh cheese forms excessive blisters, does not melt on baking, and has limited stretchability. Once aged, the cheese does acquire these characteristics, but the product has to be used since undesirable functional characteristics like excessive free-oil formation and runny texture develop on prolonged storage. Consequently, mozzarella cheese has a very limited shelf life during which its characteristics are suitable for pizza making. The cheese needs to be stored under refrigeration to increase its shelf life to any appreciable period. However, these factors make its transportation and storage very expensive.

Low-moisture (LM), and low-moisture, part-skim (LMPS) mozzarella's exhibit better shred-ability than high moisture mozzarella cheeses and, therefore, are preferentially used as pizza ingredients (Kosikowski, 1978). However, unaged, fresh, LM and LMPS mozzarella's melt poorly to a rubbery, very elastic mass with excessive blistering and limited stretch which is not suitable for pizza. In the first few weeks of refrigerated storage, however, these LM and LMPS cheeses are transformed considerably and attain desirable functionality for pizza making. The shelf-life of this "transformed" mozzarella is normally limited only to a month or less, since the changes which transform its functional characteristics to make these cheeses suitable for pizza making continue, and rapidly during storage to bring about the swift deterioration of shredding and melting properties that are important in pizza making (Kindstedt, 1993).

To solve this problem, others have used combinations of heating, mixing and adding of emulsifiers to achieve various ends, but none of these techniques have produced a mozzarella cheese from fresh curd without aging that can be stored without refrigeration. According to Shimp (1985), the use of emulsifying salts is one of the most effective ways of enhancing cheese functionality. Sodium citrate is known to provide the processed cheese a long elastic structure (Berger et al., 1989). Thermomechanical treatment during cooking and stretching influence functionality of mozzarella cheese (Kindstedt, 1993). In 1957, Kosikowski proposed a process to manufacture processed mozzarella cheese. Ripened mozzarella cheese, the principal raw material, was added with salt, emulsifiers and water, and then cooked in a kettle at 71° C. for 3 min. However, the final cheese demonstrated several poor characteristics, among them was poor stretchability.

U.S. Pat. No. 1,522,383 to Parsons et. al., relates to the low-temperature emulsification of cheese using an apparatus to provide rapid agitation and pressure. The original texture (e.g. and taste) is destroyed and an emulsified texture develops at a temperature of less than 110° F. The objective was to produce an emulsified, unpasteurized cheese, made of a blend of new and aged cheese, which can be melted for cooking purposes without fat separation. In essence a processed cheese product is made from several already made cheeses.

Along the same lines, U.S. Pat. No. 1,523,678 to Wheeler, describes improvements in devices for heat treating cheese and provides means whereby the temperature of the cheese may be rapidly, uniformly and progressively raised.

U.S. Pat. No. 2,021,899 to Schneider, teaches a process and apparatus for the treatment of soft cheeses, containing more than 40% moisture, with the object of improving the flavor, texture and keeping qualities. The method comprises incorporation of emulsifier in cheese, mechanically treating the material at an elevated temperature but not substantially above 200° F., and briefly subjecting the material to heat and then to vacuum without the addition of heat to swell the casein. Again, this patent is for converting already made soft cheeses into a processed cheese.

U.S. Pat. No. 2,733,148 to Russo, describes a method for making regular shaped cheese blocks. This is achieved by cutting the curd in the presence of hot water, heating the cut curd to soft melting stage, mixing the softened curd, paddling the mix after continuous stretching, subjecting the mix to pressure to form a block, and cooling, brining, drying, wrapping and seating the block. This patent is a variant of the current commercial practices of making conventional cheeses, and does not address the problem of additional shelf-life, or non-refrigerated storage.

U.S. Pat. No. 4,066,800 to Rouseneau et. al., teaches a method for producing new cheese foods resembling cheddar or processed cheese at a lower cost. The method used by this patent comprises co-precipitating casein, whey proteins and fat from milk by heating and acid precipitation and modifying the co-precipitate by using additives and extrusion processing to obtain cheddar or a processed cheddar type product. They use an extruder to heat and mix additives such as salt, flavorings and sodium phosphate into the co-precipitate. This process is not suitable for the production of mozzarella cheese.

U.S. Pat. No. 4,669,254 to Muzzarelli, discloses a plant for producing plastic curd mozzarella type cheeses, comprising of a curd chopping device, one kneading device for kneading the chopped curd with an aqueous liquid containing hot water and NaCl, one curd plasticizing device with mechanical implements, feeding the plasticized curd into a tubular sheath, and an apparatus for cutting and closing the sections of tubular sheath filled with plastic curd. Anyone skilled in the art and science of cheese making will recognize that these are the steps and methods used in the conventional mozzarella cheese making process. Generally speaking these steps are necessary to make mozzarella cheese but not invest the cheese produced with any additional shelf-life as a processed mozzarella cheese.

U.S. Pat. No. 5,104,675 to Callahan describes a process for making premium quality Mozzarella/Cheddar cheese having a Mozzarella-like firm texture and Cheddar flavor profile. The process comprises of blending mozzarella (60–75%) Cheddar (25–40%) and sodium citrate (<0.7%), heating to 190–220° F. for 25–45 sec, cooling, and slicing the product. This process, again describes a method for making processed cheese from a blend already made mozzarella and Cheddar cheeses, not from pure mozzarella itself.

French Patent Publication No. 2705534 relates to the manufacture and processing of dairy products with a fibrous texture, like mozzarella cheese. The reference discloses a process of manufacturing cheese which includes mixing water, proteins, carbohydrates, and an agent which slows down the agglomeration process of fibers. The mixture is treated at a temperature between 50° and 100° C. and the mixture is then extruded and cooled.

U.S. Pat. No. 5,234,700 to Barz et. al., relates to a process of making mozzarella cheese in which cheese curd is produced by the standard process and the cheese curd is heated, kneaded, and stretched at 125° to 155° F., such that the cheese has a moisture content in the range of 45 to 60 wt. %. By using this process the cheese can be ready for use immediately after aging.

In another Barz et al., patent, U.S. Pat. No. 5,567,464, relates to a process of making mozzarella cheese which includes manufacturing a cheese curd by standard procedures, heating, kneading and stretching the cheese curd, mixing an emulsifier into the already heated cheese, and forming the heated cheese into a shape. After heating the cheese has a temperature from 110° to 160° F. The shaped cheese is then cooled in cold brine. The improved baking and melting performance seen thereafter are attributed to the addition of an emulsifier (Column 4, lines 19–42).

Despite the efforts of workers in the field, as shown above, mozzarella is still considered a cheese which generally requires a significant period for appropriate aging, and which has limited shelf-life. In addition, this cheese requires to be refrigerated to inhibit the secondary fermentation which causes the deterioration of the cheese quality. Therefore, a need still exists for a mozzarella cheese produced from fresh curd that does not require aging and storage under refrigeration and has a longer shelf life than the currently available mozzarella cheeses.

The goal of the Inventors therefore, was to develop a process for manufacturing processed LMPS mozzarella cheese which requires no aging to attain desirable functional characteristics, does not need refrigerated storage, maintains its functional characteristics during storage, and has prolonged shelf-life. Development of this product promises to lead to many advantages for the cheese manufacturers. First, the product can be used fresh on pizza. Second, elimination of aging and refrigeration will significantly decrease the transportation and storage costs. Finally, the longer shelf-life should facilitate cheese export to overseas for use in pizza restaurants without the need for refrigerated transport and distribution.

SUMMARY OF THE INVENTION

The present invention is directed towards making processed mozzarella cheese that does not require any aging or refrigeration during storage, remains usable for pizza making, and has prolonged shelf-life. This is accomplished by dicing a fresh cheese curd, adding emulsifier, and thermomechanically treating in an extruder to stretch and cook the curd. This thermomechanical treatment in a twin-screw extruder under selected operating conditions, along with the addition of sodium citrate, provides an appropriately aligned fibrous structure, and good functionality in processed LMPS mozzarella cheese.

In the studied range of emulsifier levels, 0.5% sodium citrate was found to be the most suitable dose for the provision of an optimum emulsion stability that results in good functionality over an extended storage period. However, for use immediately after manufacture, 1.5% sodium citrate can be used to enhance the melting characteristics of fresh LMPS mozzarella cheese. The good functionality of the freshly processed LMPS mozzarella cheese with 0.5% emulsifier improved and desirable functionality was maintained during storage up to three months at room temperature, considerably longer than other processed mozzarella's.

The use of a higher stretching temperature (90° C.) used in the extrusion processing, when compared with conventionally used stretching temperature ranges (55–60° C.), inactivated metabolic enzymes, and lead to a slower proteolysis, which considerably extended the functionality and shelf-life of the processed cheese. In this way, fresh processed mozzarella cheese having functionality similar to the aged mozzarella cheese is achieved by addition of emulsifier to soften casein and inputting sufficient mechanical energy to establish appropriate structure. Longer shelf life and storage without refrigeration is achieved by application of suitable time-temperature combination to inactivate proteolytic enzymes and microorganisms.

The storage stability of processed cheeses thermomechanically treated in the extruder at 90° C./90 sec., and stored at room temperature, were similar to that at refrigerated temperature storage. The analysis of microbiological qualities and concentrations were comparable to recommended microbiological standards (Ramaswamy and Sivarami Reddy, 1990). Thus, the additional heat treatments reduced the microbial counts without impairing cheese functionality.

DETAILED DESCRIPTION

The present invention relates to a process for making a new type of processed mozzarella cheese. This product does not need any aging to achieve desirable performance characteristics, and can be used fresh from processing for pizza making. Moreover, the product maintains its functionality during storage, has a considerably longer shelf life, and does not need refrigeration during storage.

This invention will be very useful to cheesemakers since the product can be used fresh. Aging of cheese requires time, space and energy, and thus finally adds significantly to the cost of product. Elimination of aging will cut down the manufacturer's cost significantly.

Another major advantage this product offers is that the longer shelf life of the product makes it suitable for export purposes. With the international growth of restaurant chains serving pizza, development of longer shelf life mozzarella cheese has become a very economically desirable. Moreover, the product can be stored without refrigeration. Making the product still more attractive to the cheese manufacturers, and cheese exporters.

Traditionally, processed cheese is made from aged natural cheese in cheese kettles. While processing, the mozzarella looses its stretchability during cooking and mixing operations due to physical breaking of fibrous structure (Kosikowski, 1957). The present invention illustrates a method for making processed mozzarella cheese from fresh emulsified curd rather than aged cheese. Stretching of this fresh curd is done in a twin screw extruder to achieve and retain aligned fibrous strands.

The methods and apparatus for producing room temperature, shelf-stable, processed mozzarella cheese are described herein. The method includes the steps of: a) producing fresh curd from milk; b) dicing the curd to reduce the size and adding 0.5–2.0% sodium citrate or other suitable emulsifier; c) treating the emulsifier containing curd thermomechanically in an extruder for stretching and cooking the curd at 80–120° C., at screw speeds varying from 20 to 200 rpm. The extruded product has excellent meltability and stretchability for use immediately after manufacturing or upon extended storage. Another embodiment provides a method of preparing the said product for storage and distribution under non-refrigerated conditions.

During the normal aging of Mozzarella, smaller peptide units are formed as a result of proteolysis. These peptides require less energy to flow, resulting in good meltability on baking. In the present invention, similar fluidization effect is achieved by addition of emulsifier and the thermomechanical treatment. Consequently, even fresh cheese has desirable melt characteristics. For extending the shelf life of cheese, higher heat treatment is applied during stretching to inactivate metabolic enzymes, and any microbial presence in the cheese. This results in slow breakdown of the chemical components, leading to longer shelf life of the product. Usage of high heat treatment also helps in achieving a product with low microbial counts which makes non-refrigerated storage possible.

EXAMPLES

Mozzarella Cheese Manufacture

Low-moisture, part-skim (LMPS) mozzarella curd was made using a fresh stirred-curd, no-brine (SCNB) method (Barbano et al., 1994 incorporated herein by reference). Milk used for curd making was standardized to a final fat concentration of 2.3% and then pasteurized at 63° C. for 30 min. The pH of salted curd was 5.50, about 0.2 higher than that normally used for desired cheese pH to compromise the possible decrease in pH after processing at high temperature. In addition, increased pH produces a thinner viscosity, leading to more effective pasteurization (Berger et al., 1989). One batch of curd was divided into three parts for different levels of emulsifier: 0.5%, 1.0% and 1.5% sodium citrate (S279-500; Fisher Scientific). The salted curd was ground and blended with emulsifying salt (sodium citrate) in a mixing kettle (model 16 86; Vertical-Cutter Mixer, Stephan, Columbus, Ohio), stretched and cooked in a Wenger twin-screw extruder (model IX-52; Wenger Manufacturing Inc., Sabetha, Kans.).

A range of extruder configurations (length of heating section, screw type and screw size) were tested in the preliminary trials. An optimum configuration was selected based on its performance in retaining fat and moisture in the finished product. The extruder length consisted of five heads fitted with jackets to allow circulation of heating medium and equipped with a 1-hole die of 37.5 mm diameter. Barrel length and diameter were 780 and 52 mm, respectively. A combination of single and double flight screws of ¾ pitch was selected as optimum screw profile.

Preliminary studies were conducted by using a range of barrel temperatures (80–120° C.) and screw speeds (50–150 rpm). Optimum operating conditions of extruder system were selected based on composition and functionality of the finished cheese. Cheese stretched at different barrel temperatures in the studied range had similar moisture and fat contents. With increasing barrel temperature, extruded cheese was more homogeneous and stretchy. However, a separation of liquid fat occurred when the barrel temperature was above 110° C. Chemical and functional properties of cheeses stretched at varied screw speeds were similar. However, Berger et al. (1989) reported that good stretching and flowing properties given by the long structure of the processed cheese will be maintained if the processing is performed very gently. This finding supports that a low extrusion screw speed should be selected for stretching mozzarella curd. A feed rate of 200 g/min, specific mechanical energy (SME) of 33.73 kJ/kg, barrel temperature of 110° C., product temperature of 90° C., residence time of 90 sec, and screw speed of 50 rpm were selected. The extruded cheese was directly filled into sterilized 211×300 containers (Tin plate, "C" Enamel, Freund Can Co., Chicago, Ill.). Then, the containers were sealed, immediately cooled by immersing in ice for an hour, and stored at refrigerated (4° C.) and room (20° C.) temperatures. Literature values for LMPS mozzarella without emulsifier produced by SCNB method, stretched in a conventional mixer-cooker at 57° C. and 12 rpm and stored under refrigeration (Barbano et al., 1994) were used for comparison with the processed mozzarella experimentally produced by extrusion processing.

Analysis

To evaluate the effects of emulsifier levels on chemical and functional properties, processed LMPS mozzarella cheeses with three different emulsifier levels were analyzed during refrigerated storage at intervals of 14 days for 2 months. Second, to evaluate storage stability, the processed cheese with the best emulsifier dose selected from previous study was evaluated for microbiological quality during 45 days of room (day 1, 15, 30, and 44) and refrigerated (day 1, 20, and 44) temperature storage. Lastly, to enhance thermal treatment, the canned cheese with a temperature of 90° C. at the time of filling was given three additional heat treatments: in a water bath at 90° C./40 min. and at 100° C./30 min., and in an oil bath at 117° C./20 min. These additional heat treatments were selected on the basis of conditions reported in literature (Meyer, 1973, incorporated herein by reference). After heating, the cans were immediately cooled in ice until the internal temperature dropped to 20° C., stored at room and refrigerated temperatures for 3 months, and analyzed for functionality and microbiological quality at regular intervals of 10 days and 1 month for room and refrigerated temperature storage, respectively.

In the thermal treatment experiment, temperatures of cheeses at the extruder outlet and at the can center during heating and cooling were measured using thermocouples and recorded by a microcomputer (model P70 386, IBM). The residence time during extrusion processing was experimentally determined by injecting a dye into the feed at the start of extrusion and then observing the time required for the fastest particle to reach the extruder outlet. Obtained time-temperature data and bacteriological data ($D_T$ and z values of target organisms) were used to evaluate thermal processes. $F_T$ values, the number of equivalent minutes at 121.1° C. responsible for microbial reduction during the heating and cooling phases of the thermal processes for the given z value, were calculated by the general methods of Ball and Olson, (1957, incorporated herein by reference).

Chemical Analyses

Chemical analyses consisted of pH, moisture, fat, total, and soluble nitrogen contents. All chemical analyses, except where specified, were performed in duplicate. For pH measurements, a Xerolyt electrode (model HA405; Ingold Electrode, Wilmington, Mass.) and Accument pH meter (model 915; Fisher Scientific, Springfield, N.J.) were used (Barbano et al., 1994, incorporated herein by reference). During the first few days after cheese manufacture, changes in acidity with time occurs due to the reaction between the cheese and emulsifying salt (Berger et al., 1989, incorporated herein by reference). Cheese pH was thus determined on day 3 after the production date by directly inserting a glass electrode into the cheese sample (Kosikowski, 1982, incorporated herein by reference).

Moisture content of cheese was determined in quadruplicate. A 1.5 g of ground sample was dried at 100° C. for 24 hours in a forced air oven (Marshall, 1992, incorporated herein by reference). Fat content of cheese was measured by the Modified Majonnier Ether Extraction Method (Atherton and Newlander, 1977, incorporated herein by reference). All nitrogen measurements were performed by Kjeldahl (AOAC, 1995, incorporated herein by reference). Total nitrogen (Barbano et al., 1990, incorporated herein by reference) and non-casein nitrogen (International Dairy Federation, 1964) were measured in triplicate. Percentages of total and non-casein nitrogen were converted to milk protein equivalent by multiplying with 6.38. The contents of the nitrogen soluble in pH 4.6 acetate buffer and in 12% trichloroacetate (TCA) were determined at regular interval storage to measure proteolytic changes (Bynum and Barbano, 1985, incorporated herein by reference). Values for all soluble nitrogen were expressed as the percentages of total nitrogen contents of cheese.

Functional Analyses

Stretchability. The tensile test established by Apostolopoulos and Marshall (1991) was used to measure stretchability of melted Mozzarella. The test was performed in triplicate using an Instron Universal Testing Machine (model 1122; Instron Corp., Canton, Mass.). Stretching mode was set to lift melted cheese from a pizza. A whole assembly of melted cheese on a pizza base and circular plate was prepared as reported by Shukla et al. (1996). Then, the crosshead loaded with a 50 kg tensile cell (model 2511-104; Instron Corp., Canton, Mass.) of the Instron was arranged to attach to the center piece of the assembly. The melted cheese was stretched vertically by moving upward of the crosshead with speed of 10 cm/min. The distance which the stretched cheese traveled until its all strings fractured was expressed as stretchability.

Meltability. A Modified Schreiber's Melt Test (Kosikowski, 1982) was used for measuring meltability of mozzarella cheese in quadruplicate. The disc shaped cheese sample (7 mm height×36 mm diameter) was melted in a forced air oven at 100° C. for 7 minutes and its increase in disk diameter was measured. Meltability was reported as the ratio of the disk area to the original area.

Baking test. Pizza baking test was used to subjectively evaluate important functional characteristics (meltability, stretchability, free oil formation, and blistering) of melted cheese on pizza under actual use conditions (Kindstedt, 1993, incorporated herein by reference). 150 g of pizza sauce (Traditional Ragu, Van der Bergh Foods Co., Lisle, Ill.) and 300 g of ground cheese sample were spread evenly on a 30 cm diameter pizza base. The pizza was then baked in a conventional oven (model 1132; Impinger, Lincoln, Fort Wayne, Ind.) at 450° F. for 5 minutes. Functional properties of melted cheese and its performance on pizza were qualitatively observed.

Microbiological Analyses

Microbiological analyses consist of the standard plate count (SPC) on nutrient agar, coliform counts on Violet Red Bile Agar (VRBA), yeast and mold counts on Potato Dextrose Agar (PDA), Staphylococcus counts on Baird-Parker medium, and anaerobic sporeformer counts on Reinforced Clostridial Agar (RCA) (Marshall, 1992; Hirsch and Grinsted, 1954; both incorporated herein by reference).

Example 1

Figure 1:
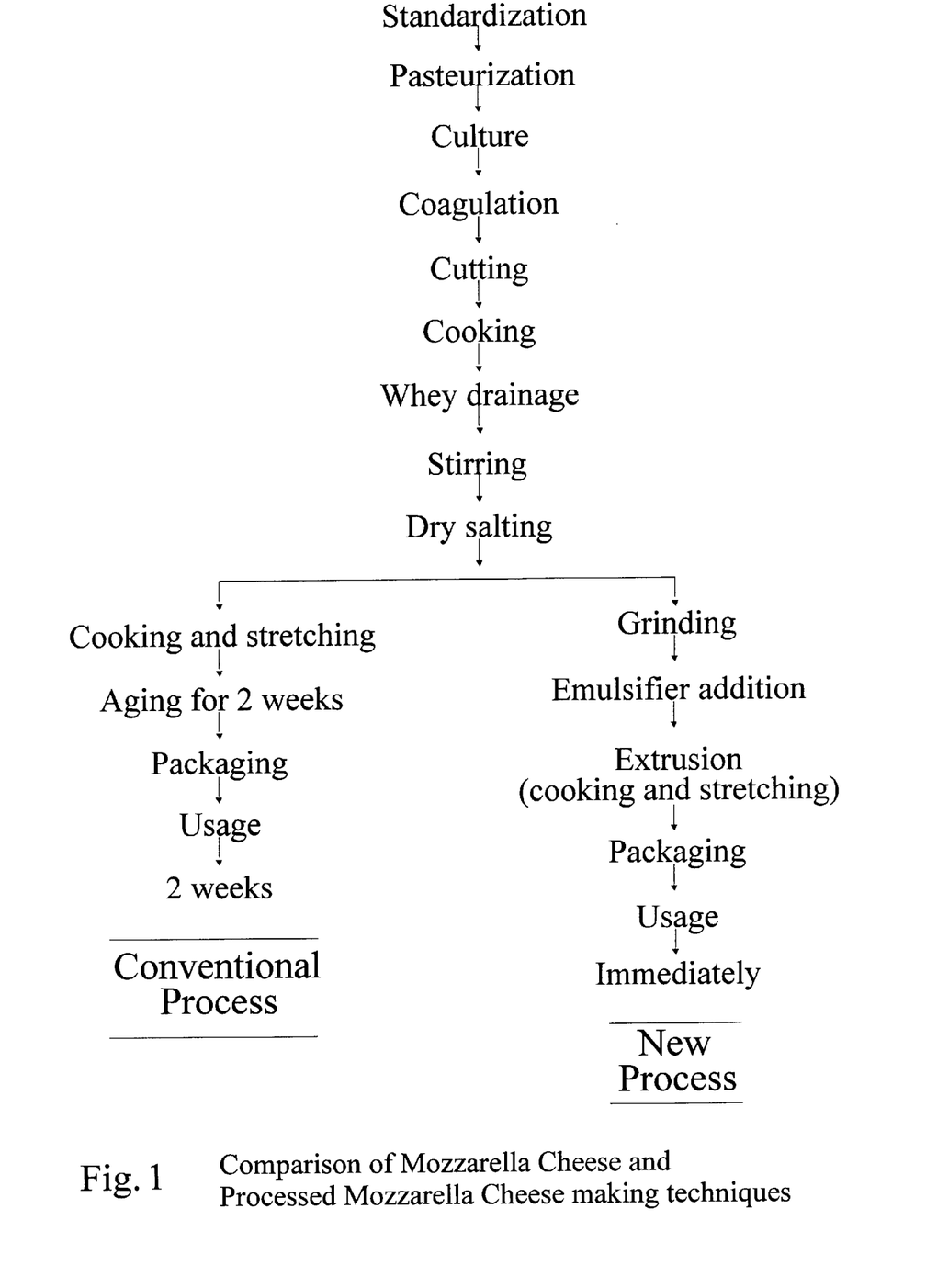
FIG. 1 shows a comparison of mozzarella cheese and processed mozzarella cheese making techniques.

Range of Extruder Operating Parameters used for Making Processed Mozzarella Cheese A range of processing parameters like stretching temperatures, screw speeds and curd feeding rate were experimented with to determine the optimum conditions (Table 1) for the processing of the fresh mozzarella curd, while FIG. 1., shows a comparison of mozzarella cheese and processed mozzarella cheese making techniques. Heating of the curd was performed by circulating hot water through the jacket of the extruder. Extruder configuration (length of heating section, screw types and feeding mechanism) were optimized to obtain well stretched product. Stretched product was filled in containers at the extruder outlet and stored under refrigeration.

TABLE 1

| Optimal Operating Parameters | |
|---|---|
| Operating Parameter | Range Used |
| Cooking & Stretching temperature (° C.) | 80–120 |
| Feeding Rate (g/min) | 150–300 |
| Screw Speed (RPM) | 20–200 |

Example 2

Comparison of Functional Characteristics of Processed Mozzarella Cheese and Aged Regular Mozzarella Cheese LMPS mozzarella cheese curd was prepared using standard stirred curd, no-brine method. Curd was diced into smaller cubes in a processed cheese kettle, mixed with 1.0% sodium citrate, and fed into hopper of twin-screw extruder (Wenger Manufacturing, Inc., Sabetha, Kans.) at a feeding rate of 200 g/min. The extruder had five heads and was fitted with a jacket to allow circulation of heating water. The barrel temperature was maintained at 90° C. and stretching was performed at a screw speed of 50 rpm. The final product had 17.4% fat and 49.3% moisture, and 5.42 pH. Thereafter, the product was stored after extrusion and analyzed periodically for chemical and functional properties.

Meltability and stretchability of the processed mozzarella were found to be comparable to the regular aged mozzarella cheese (Table 2).

TABLE 2

Mozzarella Characteristics

| Characteristics | Aged Regular Mozzarella 14 Day | Processed Mozzarella | | |
|---|---|---|---|---|
| | | 0 Day | 14 Day | 45 Day |
| Stretchability (mm) | 860 | 888 | 892 | |
| Meltability (mm) | 46.0 | 42.7 | 43.0 | 44.75 |

A pizza was baked to test and assess the baking characteristics of the product. Both fresh and stored samples showed good melting, stretching and blister formation. Protein breakdown in the samples during storage was assessed by determining pH 4.6 and 12% TCA soluble nitrogen contents. The soluble nitrogen contents showed very little changes during storage, indicating slow proteolysis of the product. Table 3, depicts the changes in soluble nitrogen contents of processed mozzarella cheese during storage.

TABLE 3

Soluble Nitrogen Content of Processed Mozzarella

| Storage time (Days) | 12% TCA soluble nitrogen | pH 4.6 soluble nitrogen |
|---|---|---|
| 7 | 0.4377 | 0.8381 |
| 21 | 0.4406 | 0.9278 |

Microbial quality of fresh and one month old samples also did not show any significant differences (Table 4), indicating good microbial stability of the product.

TABLE 4

Microbial Presence

| Storage Time | Standard Plate Count (count/g) | Coliform Count (count/g) | Yeast and Mold Count (count/g) |
|---|---|---|---|
| 0 Day | 440 | <1 | <10 |
| 31 Day | 530 | <1 | <10 |

Thus, the present invention teaches a novel processed mozzarella cheese prepared from fresh curd that does not need to be aged, can be stored without refrigeration and maintains all functional attributes of conventional mozzarella cheese.

The processed mozzarella cheese produced with the twin-screw extruder under the selected operating conditions, outlined above, generated a cheese with a homogeneous texture, a firm consistency, and an appropriately fibrous structure. Thermal treatment, together with mechanical application of the extruder system, resulted in a shortening and aligning of the protein structure as well as a firming of the body, leading to appropriate fibrous structure and melting properties in the finished cheese. According to Apostolopoulos et al. (1994, incorporated herein by reference), use of a twin-screw extruder to stretch mozzarella curd needed an exogenous water supply, otherwise, an unmixed and lumpy curd would be obtained. The present study showed that a homogeneous, plastic, stringy cheese mass is obtained by using extrusion processing and addition of emulsifier without any exogenous water supply. This inconsistency with the prior art highlights the important role of the emulsifier in stabilizing the oil/water phase, and the experiments of the inventors.

Example 3

Effect of Emulsifier Levels on Chemical and Functional Properties of Processed LMPS Mozzarella Cheese Chemical properties of processed mozzarella cheeses containing 0.5%, 1.0%, and 1.5% sodium citrate and the literature values for regular LMPS mozzarella are shown in Table 5. The moisture and fat (on a dry basis) contents of the three processed mozzarella cheeses were within the legal range for low-moisture, part-skim mozzarella (Tunick et al., 1991). Due to the high pH value of trisodium citrate dehydrate (pH 8.2), the pH values for the processed cheese were adjusted to higher values (5.42–5.48) than the literature value (5.22) and were within the pH range of 5.3–6.2 which provided proper protein configuration, protein solubility and emulsifying power (Shimp, 1985).

Moisture and pH of the three cheeses were similar. However, an increase in fat content was noted with increasing emulsifier levels. Due to the emulsifying power of sodium citrate, its higher levels may result in better fat retention. Overall, the moisture and fat contents of the processed mozzarella cheeses stretched by the twin-screw extruder were comparable to the reported literature values (Barbano et al., 1994) for mozzarella cheese stretched conventionally.

TABLE 5

Moisture, Fat and pH of Processed Mozzarella Cheeses

| | Wt % Moisture (Wet Basis) | Wt % Fat (Dry Basis) | pH |
|---|---|---|---|
| 0.5% Emulsifier (Sodium Citrate) | 48.05 | 35.90 | 5.42 |
| 1.0% Emulsifier (Sodium Citrate) | 49.59 | 37.61 | 5.45 |
| 1.5% Emulsifier (Sodium Citrate) | 49.72 | 39.34 | 5.48 |
| Literature Values* | 48.4 | 38.20 | 5.22 |

*Barbano et al., 1994.

Figure 2:
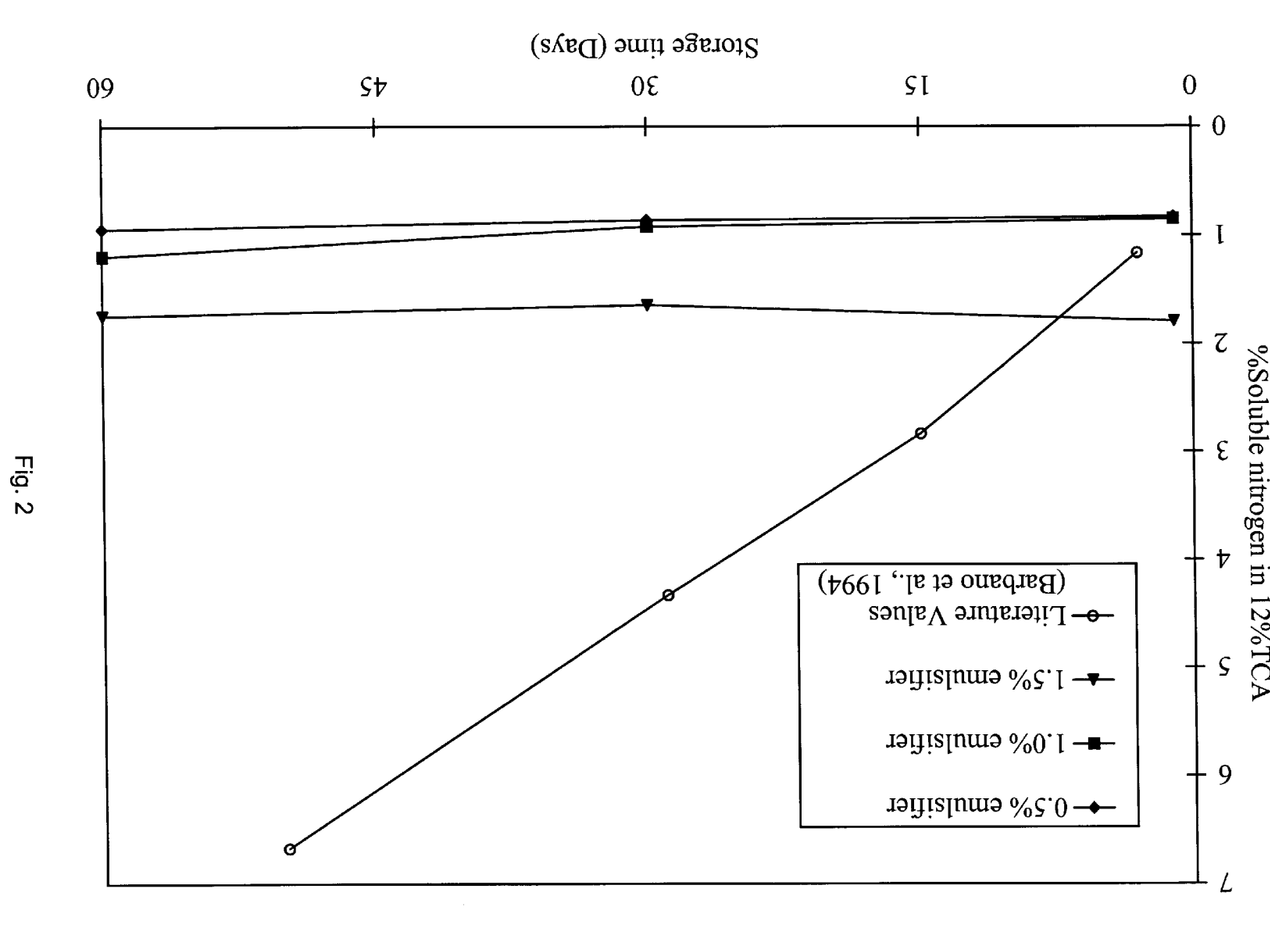
FIG. 2 shows the percentage of soluble nitrogen in a 12% TCA solution, for mozzarella cheeses with 0.5%, 1.0%, and 1.5% emulsifier in comparison with the literature values for conventional LMPS mozzarella cheese during two months of refrigerated storage.
Figure 3:
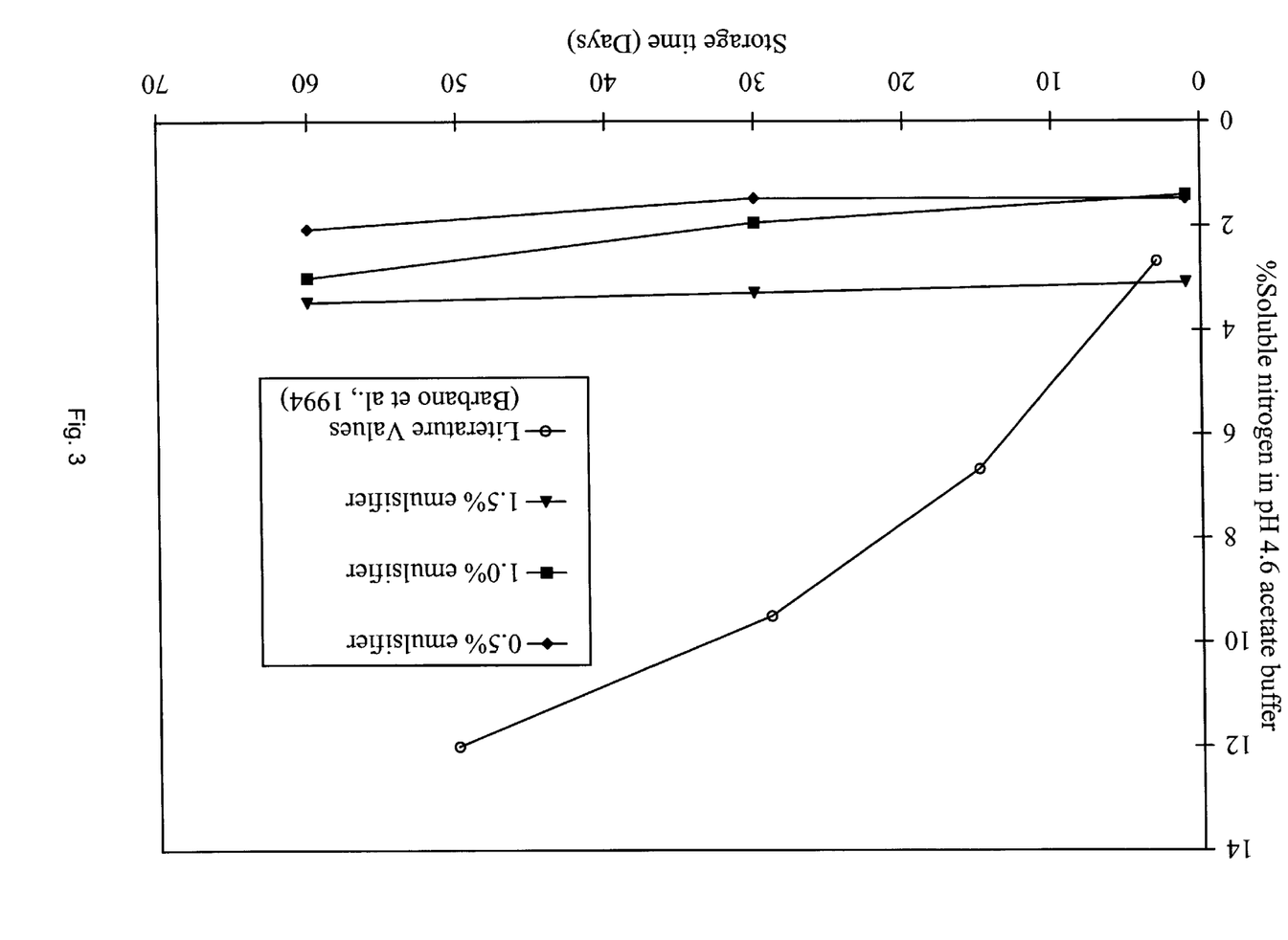
FIG. 3 shows the percentage of soluble nitrogen in a pH 4.6 acetate buffer for mozzarella cheeses made with 0.5%, 1.0%, and 1.5% emulsifier in comparison with the literature values for conventional LMPS mozzarella cheese during two months of refrigerated storage.
Figure 4:
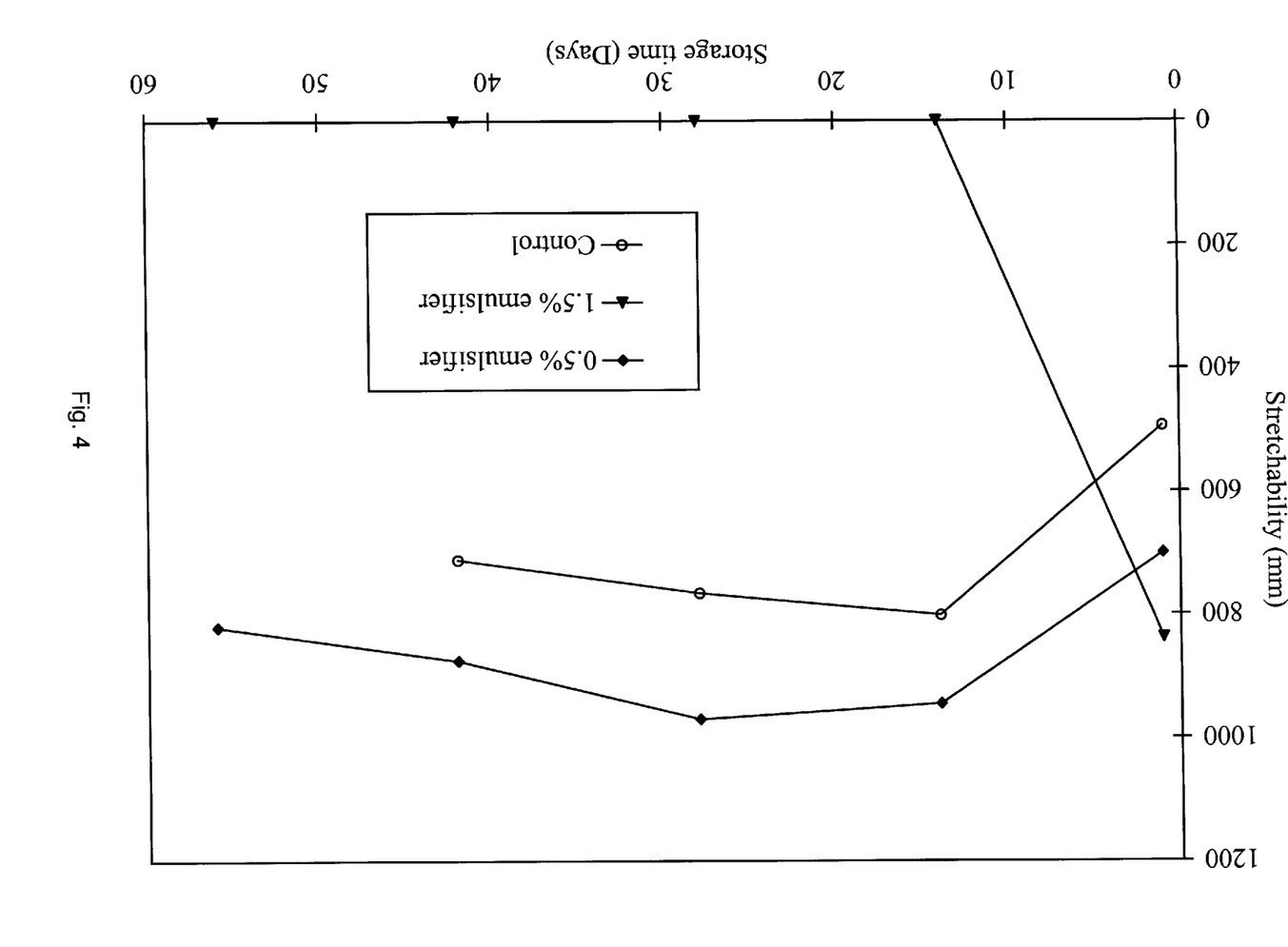
FIG. 4 shows the stretchability values of processed LMPS mozzarella cheeses containing 0.5%, 1.0%, and 1.5% sodium citrate and the control cheese during two month refrigerated storage.

The pH 4.6 acetate buffer and 12% TCA soluble nitrogen of 0.5%, 1.0%, and 1.5% emulsifier containing processed LMPS mozzarella cheeses and the literature values for regular LMPS mozzarella cheese during refrigerated storage are shown in FIGS. 2 and 3. Soluble nitrogen in pH 4.6 is associated with protein breakdown from casein to small peptides, and thus determines both large and small peptides produced by the activity of proteases and peptidases. The 12% TCA soluble nitrogen measures only the very small peptides and amino acids produced by proteases and peptidases activity. Therefore, the extent and depth of proteolysis are represented by the pH 4.6 acetate buffer and 12% TCA soluble nitrogens, respectively (Barbano et al., 1992). Both pH 4.6 acetate buffer and 12% TCA soluble nitrogen contents of the processed LMPS mozzarella cheeses with 0.5% and 1.0% emulsifier were similar and slightly lower than that of the 1.5% emulsifier containing cheese.

Because of the influence of emulsifier on fat dispersion and protein structure, a higher level of emulsifier brought about higher water solubility of caseins and thus weaker protein-protein interaction, resulting in higher proteolysis and also higher soluble nitrogen content. During refrigerated storage, low and stable pH 4.6 acetate buffer and 12% TCA soluble nitrogen contents of the three cheeses were observed, as compared with the literature values, indicating lower and delayed proteolytic changes. Soluble nitrogen content in pH 4.6 acetate buffer was higher than that in 12% TCA. This result implies that during aging, the cheeses had undergone broad extent, but small depth of proteolysis.

Stretchability values of the 0.5%, 1.0%, and 1.5% emulsifier containing processed LMPS mozzarella cheeses and the control cheese (without emulsifier) during sixty days of refrigerated storage were experienced. The freshly manufactured cheese with 1.5% sodium citrate had the highest stretchability of 838 mm and then dramatically lost its stretchability on further storage. The processed LMPS mozzarella cheese containing 0.5% emulsifier exhibited an increase in stretchability during the first two weeks and maintained high stretchability of about 900 mm during extended storage. This improved stretchability could be associated with less elastic and softer texture as a result of protein breakdown during aging. The control cheese had a similar trend of stretchability over storage to that of the 0.5% emulsifier containing cheese, but attained lower values throughout storage. The stretchability values of the 1.0% emulsifier containing processed LMPS mozzarella cheese were between those for the 0.5% and 1.5% emulsifier containing cheeses.

Meltability scores of the 0.5%, 1.0%, and 1.5% emulsifier containing processed LMPS mozzarella cheeses, compared to the literature values. During the first 3 weeks, all processed cheeses had higher meltability than the literature values. The 1.5% emulsifier containing cheese exhibited initial dramatic increase in meltability and had much higher meltability than the other cheeses. The meltability of fresh 1.5% emulsifier cheese and 1 week old cheeses containing 0.5% and 1.0% emulsifier were comparable to the literature values for regular LMPS mozzarella aged for 2 weeks. Desirable meltability of 2–4 week old regular LMPS mozzarella (1.5–1.8) was attained in only 1–2 week old cheeses containing 0.5% and 1.0% emulsifier. With the aid of sodium citrate, adverse effects of calcium on water solubility and emulsifying power of casein were inhibited by exchanging calcium for sodium or binding to calcium, leading to enhanced emulsifying power of the proteins. However, the extent of emulsification was determined by the protein/fat ratio which had an important effect on the limits to which texture can be improved (Shimp, 1985). When aged longer, the 0.5% emulsifier cheese still maintained its optimum meltability of about 1.7, while the meltability of the other processed cheeses, including regular LMPS Mozzarella, became too high.

During aging, the para-casein matrix undergoes proteolysis, bringing about change in microstructure (Lawrence et al., 1983; Kiely et al., 1992; both incorporated herein by reference). Since meltability is influenced by chemical and microstructure (Shukla et al., 1996, incorporated herein by reference), microstructural transformation during aging leads to change in cheese meltability. However, the increasing meltability trends of the processed cheeses leveled off over extended storage, whereas that of the regular LMPS mozzarella tends to continually increase, indicating slower proteolysis in the processed cheeses. Suitable meltability of the 0.5% emulsifier cheese over the extended storage was probably associated with its high emulsion stability which provides improved texture.

Like regular LMPS mozzarella cheese, the melted processed cheese on pizza generally had bright, slightly yellowish color, mild taste, and very slight acid flavor. On day one of the baking test, the 1.5% emulsifier containing processed LMPS mozzarella cheese showed good stretchability and meltability with lower extent of free oil formation and blistering while the 0.5% and 1.0% emulsifier containing cheeses exhibited tough and grainy texture as well as excessive blistering. After two weeks of storage, baking performance of the 1.5% emulsifier cheese deteriorated and undesirable melting properties, such as runny texture and oiling-off appeared, while those of the 0.5% and 1.0% emulsifier cheeses improved and optimum functionality, such as good melt and stretch with less elasticity, were developed. However, excessive melt was observed in the 1.0% emulsifier cheese after 30 days of storage whereas the 0.5% emulsifier cheese maintained its good melt characteristics throughout storage. Compared to the control cheese (without emulsifier), the processed cheese with 0.5% emulsifier had less free oil formation and blistering as they aged longer.

Emulsifying salt at a level of at least 0.5% gives suitable emulsion power and effective emulsification of fat globules at the cheese surface, and thus leads to less coalescence of fat globules and free oil formation (Kindstedt, 1993, incorporated herein by reference). In addition, the processed LMPS mozzarella produced by extrusion processing had less oiling off than the regular LMPS mozzarella stretched conventionally, probably due to a reduction of size of fat globules by applied mechanical shear of the extruder. The 0.5% emulsifier cheese was selected for further studies because of its optimum functionality over extended storage.

Example 4

Storage Stability at Room and Refrigerated Storage Temperatures

To determine the storage stability of processed LMPS mozzarella cheese and the adequacy of heat treatment, microbiological qualities of 0.5% emulsifier containing cheese in cans were evaluated during 45 days of room and refrigerated temperature storage as shown in Table 6. Low SPC was observed in the processed cheese, both stored at room and refrigerated temperatures. During storage, the SPC tended to decrease, probably due to an inhibition of growth of aerobic microorganisms under anaerobic condition of hermetically sealed cans. Coliform bacteria, yeast and molds were less than 1 count/g cheese and Staphylococci were less than 10 counts/g cheese throughout room and refrigerated temperature storage. However, anaerobic sporeformers existed. According to Ramaswamy and Sivarami Reddy (1990), critical anaerobic sporeformers (*Clostridia bacilli*) can survive 85–90° C. heat during the melting process. It is, therefore, likely that thermal treatment applied in the extruder at 90° C./90 sec was not enough to destroy anaerobic sporeformers.

TABLE 6

Microbiological Assessment of Processed LMPS mozzarella
Cheeses containing Sodium Citrate Stored at Room and Refrigerated Temperatures

| | Counts per Gram of Cheese | | | | | | |
|---|---|---|---|---|---|---|---|
| | Room Temperature (20° C.) | | | | Refrigerated Temperature (4° C.) | | |
| Tests | Day 1 | Day 15 | Day 30 | Day 44 | Day 1 | Day 20 | Day 44 |
| Standard Plate Count* | 300 | E120 | E60 | E95 | 300 | 250 | E140 |
| Yeast and Molds | <1 | <1 | <1 | <1 | <1 | <1 | <1 |
| Coliforms | <1 | <1 | <1 | <1 | <1 | <1 | <1 |

*E = Estimated SPC, when every dilution had more than 250 or less than 25 colonies per plate.

The recommended microbiological standards for processed cheese, reported by Ramaswamy and Sivarami Reddy (1990, incorporated herein by reference), are zero count of coliforms in 0.1 g cheese, maximum of 60 yeast and molds, 200 aerobic spores, 100 anaerobic spores per gram of processed cheese. Microbiological qualities of canned cheeses for both room and refrigerated storage were comparable to this microbial standard. However, to produce longer shelf-life processed cheese, heat treatment may need to be enhanced.

Example 5

Shelf-Life Extension by Additional Heat Treatment

Initial standard plate count (SPC) of the processed cheeses ranged from low (120 counts per g cheese) to moderate (440 counts per g cheese) values. During three months of room temperature storage, the SPC in all cheeses undergoing different additional heat treatments tended to decrease (Table 7). Overall, the SPC of the canned cheeses further heated at 117° C./20 min. and at 100° C./30 min., were lower than those heated at 90° C./40 min. and those without any additional heating, respectively. Coliform bacteria, yeast and molds were less than 1 count per gram of cheese for all the processed cheeses throughout storage, indicating good sanitation during processing and packaging. Less than 10 counts of Staphylococci and mesophilic anaerobic sporeformers per gram of cheese were found in all cheeses during storage.

TABLE 7

Microbiological Analysis of 0.5% Emulsifier (sodium citrate)
Containing Processed LMPS mozzarella Cheeses with Additional Heat Treatments
During Three Months of Room and Refrigerated Temperature Storage.

| | Standard Plate Count (SPC) per gram of Cheese | | | | | | | |
|---|---|---|---|---|---|---|---|---|
| Heat | Room Temperature (20° C.) | | | | Refrigerated Temperature (4° C.) | | | |
| Treatments | Day 1 | Day 35 | Day 56 | Day 90 | Day 1 | Day 35 | Day 56 | Day 90 |
| | Without Additional Heat Treatments | | | | | | | |
| | E440 | 340 | 240 | E85 | E440 | 600 | 480 | 410 |
| | With Additional Heat Treatments | | | | | | | |
| 90° C./40 min. | E320 | E140 | E95 | E120 | E320 | E25 | E210 | E200 |
| 100° C./30 min. | E120 | <10 | E35 | E50 | E120 | 300 | E25 | E150 |
| 117° C./20 min. | E260 | E15 | E40 | E100 | E260 | E55 | E60 | E40 |

E = Estimated SPC, when every dilution had more than 250 or less than 25 colonies per plate.

Bacillus, which is a facultative anaerobe, was a species identified in the cheese samples. It is likely that Bacillus existing in the cheese was *Bacillus licheniformis*. Based on the microbiological standard, all cheeses with and without added heat were considered to have good microbiological quality. The additional heat treatments slightly reduced microbial counts. The cheeses stored at refrigerated temperature (Table 7) had similar microbiological quality to those stored at room temperature and both had extended shelf-life up to 3 months. This provides the feasibility of developing the processed cheese that has prolonged shelf-life and does not require refrigerated storage.

No significant effect of additional heat treatments on stretchability was observed in the processed cheeses stored under refrigeration, but there were different stretchability trends for room temperature storage among processed cheeses given further heat treatments. During the last two months of 90 day storage, the cheeses at refrigerated storage exhibited higher stretchability than those stored at room temperature for the same periods of time.

For both room and refrigerated temperature storage, meltability scores of the cheeses given additional heat treatments were similar and slightly higher than the cheese without added heat. This result could be explained by the fact that the extra heat treatment resulted in higher extents of melted fat and rearrangement of protein molecules, promoting flowability and meltability of the processed cheeses. In addition, a gradual increase in meltability with increasing storage time was observed in all cheeses at both storage temperatures. The cheeses aged at room temperature showed similar meltability scores to those with the same age at refrigerated storage temperature.

Using Numerical Integration: Trapezoidal and Simpson's Rules (Ball and Olson, 1957), total sterilizing values of the canned products undergoing different heat treatments were calculated for given $D_{118}$ (0.41 min.) and z (6.58° C.) of *Bacillus licheniformis*. The values for $D_{118}$ and z used in the present study were average values obtained by capillary and thermoresistometer methods (Condon et al., 1989, incorporated herein by reference). The sterilizing values ($F_{121.1}^{6.58}$), representing the heat treatment of 117° C./20 min., 100° C./30 min., 90° C./40 min. and those without additional heat treatments were 0.022, 0.00079, 0.00035 and 0.000079 min., respectively. This is in agreement with the microbiological result showing lower SPC in the canned cheese further heated to 117° C./20 min. The sterilizing value ($F_{121.1}^{6.58}$) required to reduce a given number of organisms at 121.1° C. to attain a desired Probability of Non-Sterile Unit (PNSU) was 1.65 min. as described by following equation: $F_{121.1}^{6.58} = D_{121.1}^{6.58} (\log N_0 - \log N_F)$ where $D_{121.1}^{6.58} = D_{118}^{6.58} \times 10^{(118-121.1)/6.58} = 0.138$ and $\log N_0 - \log N_F$ is assumed to be 12 log cycles. The total sterilizing value for each of the thermal processes was lower than the required sterilizing value. This result indicates that more severe thermal treatment is needed to achieve commercial sterility for longer shelf-life products.

LITERATURE CITED AND INCORPORATED BY REFERENCE

1. Apostolopoulos, C. and Marshall, R. J. 1991. *Functional properties of mozzarella cheese as a pizza topping. A report produced for European Economic Community*. AFRC Institute of Food Research, Reading University, U.K.
2. Apostolopoulos, C., Bines, V. E., and Marshall, R. J. 1994. *Effect of post cheddaring manufacturing parameters on the melt-ability and free oil of mozzarella cheese*. Journal of the Society of Dairy Technology. 47(3):84–87.
3. AOACL 1995. *Official Methods of Analysis*, 16th ed. Association of Official Analytical Chemists International., Arlington, Va.
4. Atherton, H. V. and Newlander, J. A. 1977. *Chemistry and Testing of Dairy Products*, 4th ed. AVI Publ. Co., Westport, Conn.
5. Attiyate, Y. 1979. *Continuous cheese cooker-sterilizer*. Food Engineering International. 4(10):50.
6. Ball, C. O. and Olson, F. C. W. 1957. *Sterilization in Food Technology; Theory, Practice and Calculations*. McGraw-Hill Book Co., New York.
7. Barbano, D. M., Clark, J. L., Dunham, C. E., and Fleming, J. R. 1990. *Kjeldahl method for determination of total nitrogen content of milk: collaborative study*. J. Assoc. Offic. Anal. Chem. 73:849.
8. Barbano, D. M., Yun, J. J.. Kindstedt, P. S. and Kiely, L. J. 1992. *Rod-to-coccus ratio: change in cell count during mozzarella manufacturing and impact on proteolysis during refrigerated storage*. Proc. 29th Annu. Marschall Italian Cheese Sem., Rhone-Poulenc, Madison, Wis.
9. Barbano, D. M., Yun, J. J., and Kindstedt, P. S. 1994. *mozzarella cheese making by a stirred curd, no brine procedure*. J. Dairy Sci. 77:26872694.
10. Berger, W., Klostermeyer, H., Merkenich, K., and Uhlmann G. 1989. *Processed Cheese Manufacture—A JOHA Guide*. BK Ladenburg Gmbh, Freising, Germany.
11. Bynum, D. G. and Barbano, D. M. 1985. *Whole milk reverse osmosis retentates for Cheddar cheese manufacture: chemical changes during aging*. J. Dairy Sci. 68: 1.
12. Condon, S., Lopez, P., Oria, R., and Sala, F. J. 1989. *Thermal death determination: design and evaluation of a thermo-resistometer*. J. Food Sci. 54(2):451–456.
13. Hirsch, A. and Grinsted, E. 1954. *Methods for the growth and enumeration of anaerobic sporeformers from cheese with observations on the effect of nisin*. J. Dairv Res. 2 1: 101.
14. International Dairy Federation. 1964. *Determination of casein content of milk*. Int. Dairy Fed. Standard 29 Int. Dairy Fed., Brussels, Belgium.
15. Kiely, L. J., Kindstedt, P. S., Hendricks, G. M., Levis, J. E., Yun, J. J., and Barbano, D. M. 1992. *Effect of draw pH on the development of curd structure during the manufacture of mozzarella cheese*. Food Struct. 11:217.
16. Kindstedt, P. S. 1993. *Effect of manufacturing factors, composition, and proteolysis on the functional characteristics of mozzarella cheese*. Critical Reviews in Food Science and Nutrition. 33(2):167–187.
17. Kosikowski, F. V. 1957. *Processed mozzarella cheese*. Milk products Journal. 48(6):10–11, 50.
18. Kosikowski, F. V. 1978. *Cheese and Fermented Milk Foods*, 2nd ed. F-V Kosikowski and Associates. Brooktondale, N.Y.
19. Kosikowski, F. V. 1982. *Cheese and Fermented Milk Food*, (2nd ed. Edwards Brother Inc., Ann Arbor, Mich.).
20. Lawrence, R. C., Gilles, J., and Creamer, L. K. 1983. *The relationship between cheese texture and flavor*. N.Z.J. Dairy Sci. Technol. 18:175.
21. Mahfouz, M. B., El-Dien, H. F., Ei-shibiny, S., Haggag, H. F., and Magdoub, M. N. 1986. *Chemical and microbiological quality of market processed cheese*. Egyptian Journal of Dairy Science. 14(1):33–41.
22. Marshall, R. T. 1992. *Standard Methods for the Examination of Dairy Products*, 16th ed. Am. Publ. Health Assoc. Inc., Washington, D.C.
23. Meyer, A. 1973. *Processed Cheese Manufacture*. Food Trade Press, London, U.K.
24. Ramaswamy, K. and Sivarami Reddy, K. 1990. *Microbiological standards for processed cheese*. Indian Dairyman. 42(4):205–208.
25. Shimp, L. A. 1985. *Process cheese principles*. Food Technol. 39(5):63–69.
26. Shukla, A., Rizvi, S. S. H., Sokhey, A. Sapru, A., and Barbano, D. M. 1996. *Twin screw extrusion of mozzarella cheese: effect of extruder operating conditions on chemical properties*. J. Dairy Sci. In press.
27. Tunick, M. H., Mackey, K. L., Smith, P. W., and Holsinger, V. H. 1991, *Effects of composition and storage on the texture of mozzarella cheese*. Neth. Milk Dairy J. 45:117–125.
28. United Stated Department of Agriculture. 1993. Dairy and Poultry Statistics. Agric. Statistics Board, USDA, Washington, D.C.

The foregoing description has been directed to particular embodiments of the invention in accordance with the requirements of the Patent Statutes for the purposes of illustration and explanation. It will be apparent, however, to those skilled in this art that many modifications and changes will be possible without departure from the scope and spirit of the invention. It is intended that the following claims be interpreted to embrace all such modifications and changes.

What is claimed is:

1. A method for producing a shelf-stable, processed mozzarella cheese that does not require the use of a stirred curd no-brine method, comprising the steps of:

a) producing a mozzarella cheese fresh curd from milk;

b) mixing into said curd from 0.01 to 2.0% by weight of an emulsifier;

c) feeding said curd mixed with said emulsifier into an extruder and thermomechanically processing said curd so as to simultaneously stretch and cook said curd at a temperature range of 80 to 120° C., wherein a screw speed of said extruder ranges from 10 to 200 rotations per minute;

wherein said cheese product requires no aging prior to use;

wherein said cheese product requires no refrigeration;

wherein said cheese product has a prolonged shelf life versus comparable mozzarella cheeses not made with said method, said cheese product having a proportionately larger share of proteolytic enzymes and microorganisms inactivated, which causes changes in cheese functionality characteristics in comparison to aged processed mozzarella cheeses; and wherein said extruder produces said cheese product usable in baking immediately while retaining a physical consistency of an aged and processed mozzarella cheese.

2. The method of claim 1 where the emulsifier is selected from the group of compounds consisting of citrates and phosphates.

3. The method of claim 2 where the emulsifying agent is sodium citrate.

4. The method of claim 1 where the temperature range at which said curd is stretched is greater than 90° C.

5. The method of claim 1 where the screw speed of said extruder is less than 70 rotations per minute.

6. The method of claim 1 wherein sodium chloride is added at 0.5 to 2.5% by weight to said curd.

7. The method of claim 6 wherein the pH of said curd is about 5.40 after addition of sodium chloride.

8. A mozzarella cheese product, produced in accordance with the process of claim 1.

9. The cheese product of claim 8 wherein an unrefrigerated shelf life of said mozzarella cheese product is at least 20 days.

10. The method of claim 1 wherein an unrefrigerated shelf life of said cheese product is at least 20 days.

11. A cheese extruder apparatus capable of producing a shelf-stable, processed mozzarella cheese product, comprising:

a) a device for dicing a mozzarella cheese fresh curd to reduce a size of individual pieces;

b) means for adding 0.01–2.0% by weight of an emulsifier to said curd;

c) an extrusion chamber for treating said curd, after addition of said emulsifier, thermomechanically;

d) a screw for stretching said curd capable of turning within said extrusion chamber at a screw speed between 10 to 200 rotations per minute;

e) means for heating said extrusion chamber to a temperature range of 80 to 120° C.; and f) means for feeding said curd into said extrusion chamber such that said curd is thermomechanically treated within said extrusion chamber to bring said mozzarella cheese product to stability wherein an unrefrigerated shelf life of said cheese product is at least 20 days.

* * * * *